United States Patent [19]

Heidel

[11] Patent Number: 5,032,659

[45] Date of Patent: Jul. 16, 1991

[54] PROCESS FOR PREPARING WATER-ABSORBING AND WATER-SWELLABLE POLYSACCHARIDE GRAFT POLYMERS

[75] Inventor: Klaus Heidel, Marl, Fed. Rep. of Germany

[73] Assignee: Huels Aktiengesellschaft, Marl, Fed. Rep. of Germany

[21] Appl. No.: 299,984

[22] Filed: Jan. 23, 1989

[30] Foreign Application Priority Data

Jan. 21, 1988 [DE] Fed. Rep. of Germany ....... 3801633

[51] Int. Cl.$^5$ .............................................. C08L 51/02
[52] U.S. Cl. ................................. 527/300; 527/312; 527/313; 527/314
[58] Field of Search ................ 527/300, 312, 313, 314

[56] References Cited

U.S. PATENT DOCUMENTS 4,690,996 9/1987 Shih et al. ............................ 527/312
4,777,232 10/1988 Heidel ................................. 527/300
4,898,921 2/1990 Humphrey et al. ................. 527/300

Primary Examiner—Ronald W. Griffin
Attorney, Agent, or Firm—Oblon, Spivak, McClelland, Maier & Neustadt

[57] ABSTRACT

Water-absorbing and water-swellable polysaccharide graft polymers are prepared by inverse suspension polymerization of a polysaccharide with an ethylenically unsaturated monomer containing a carboxyl group followed by partial water removal and crosslinking.

15 Claims, No Drawings

PROCESS FOR PREPARING WATER-ABSORBING AND WATER-SWELLABLE POLYSACCHARIDE GRAFT POLYMERS

BACKGROUND OF THE INVENTION

1. Field of the Invention

The present invention relates to an improved process for preparing strongly water-absorbing and water-swellable polysaccharide-(meth)acrylic acid graft polymers. The present invention also relates to the polysaccharide-(meth)acrylic acid graft polymers produced by this process.

2. Discussion of the Background

Water-absorbing polymers have a number of uses in the sanitation and health fields as water absorbents in paper diapers and towels, tampons, hospital bedding, electrolyte thickeners in dry cells, moisture-holding media or water reservoirs in agriculture, and as drying agents. In these applications, both the absorption capacity and the rate of absorption are important.

Suitable polymers are derivatized polysaccharides, generally grafted with water-soluble vinyl monomers, such as carboxymethylcellulose, hydrolyzed starch-acrylonitrile graft polymers, acrylic acid-starch graft polymers, or fully synthetic, slightly crosslinked polymers such as partially crosslinked polyacrylic acid salts or partially crosslinked polymaleic acid derivatives.

Processes for preparing polysaccharide graft polymers by grafting (meth)acrylic acid on starch in an aqueous solution are disclosed by Japanese Patents 40-43,408 and 80-139,408. However, the following difficulties arise in the crosslinking polymerization of water-soluble monomers in aqueous solution to prepare particulate gels:

(1) Water-swollen gels that are difficult to handle are obtained as reaction products. The solid has to be separated from the aqueous phase by precipitation, so that it occurs in a lumpy form. It then must be dried and ground.

(2) Mixing and stirring of aqueous solutions are not possible even with low solids contents of 10 to 20% because of the swelling of the graft polymers and high viscosity. For this reason, a controlled reaction cannot be carried out in conventional stirring equipment.

(3) Effective grafting of water-soluble monomers on starch to form gels containing graft polymers with a branched-chain structure necessary for good water absorption capability is not possible in purely aqueous reaction media, since water-soluble monomers like acrylic acid or acrylamide polymerize here in an unavoidable side reaction to form water-soluble ungrafted homopolymers, which have only a thickening action but are not water-swellable, and therefore impede the water-absorption capability.

It has therefore been attempted to prepare polysaccharide graft polymers by suspension polymerization.

An inverse suspension polymerization (water-in-oil suspension polymerization) for grafting polysaccharides with water-soluble monomers is described in DE-OS 28 40 010. The process has the following features:

(1) The monomers are added to the organic phase in the form of an aqueous solution that is prepared in a separate reaction vessel, together with a relatively high additional quantity of a preferably ionic water-soluble surfactant. The surfactant here is considered to be necessary for homogeneous distribution of the aqueous phase in the organic phase. This so-called semicontinuous procedure thus requires an additional reaction vessel which has to be equipped with a cooler to carry off the heat of neutralization when using acrylic acid as the monomer.

(2) Mixtures of ionic and nonionic surfactants are preferably used in large additional amounts of from 0.5 to 12% based on the solvent.

(3) As shown in the examples, the water-soluble monomers, acrylic acid and acrylamide, are preferably used in such quantities that water-soluble polymers are obtained, and not water-swellable, gel-like graft polymers.

(4) No crosslinking agents are used.

Japanese Patent 80-161,813 describes the preparation of a water-absorbing graft polymer by grafting a polysaccharide with acrylic acid in an aliphatic hydrocarbon as solvent in the presence of an organophilic nonionic surfactant and a water-soluble initiator. However, the product formed in the polymerization has a tendency to clump.

In European Patent 36,463 A2, an oil-soluble surface-active substance with a relatively high hydrophil-lipophil balance (HLB value) of 8 to 12, for which sorbitan monolaurate is preferred, is used in the inverse suspension polymerization of acrylates without polysaccharide. Severe gel formation and clumping occur during the polymerization. The products are distinguished by high water absorption capacity. The cost of equipment is relatively high.

DE-OSS 33 31 644 and 35 07 775 describe water-in-oil suspension polymerizations for the preparation of polyacrylate powders, for which oil-soluble protective colloids or surfactants with low HLB values must be used. After partial dehydration and crosslinking, polymers are obtained that contain no polysaccharide. The water absorption capacity is satisfactory. The polymerization is carried out by a continuous process with relatively high costs for equipment, with the aqueous monomer solution being prepared by neutralization of acrylic acid with an aqueous solution of alkali metal hydroxide or ammonium hydroxide with cooling in a separate reaction vessel, and being fed at a controlled rate to the organic solution.

Uncrosslinked polysaccharide graft polymers are prepared by inverse suspension polymerization in DE-OS 36 13 309. Polar and nonpolar nonionic surfactants are added in this case. Powdered graft polymers with high water absorption capacity are obtained. However, not all of the needs are met for products requiring high suction power, such as diapers and towels.

SUMMARY OF THE INVENTION

Accordingly, it is one object of the present invention to provide a novel process for the preparation of graft polymers from a polysaccharide and at least one water-soluble ethylenically unsaturated monomer containing carboxyl or carboxylate groups.

It is another object of the present invention to provide polysaccharide graft polymers which exhibit high water absorption and high water suction.

It is a further object of the present invention to provide polysaccharide graft polymers which occur as powders.

These and other objects which will become apparent during the course of the following description have been achieved by the single-step, batch, inverse suspension polymerization of (a) from 1 to 30% by weight of a polysaccharide, (b) from 70 to 99% by weight of (meth)acrylic acid, which is 50 to 100% neutralized, and (c) from 0 to 25% by weight of other ethylenically unsaturated monomers which contain a carboxyl group; followed by:

(a) reducing the water concentration, by azeotropic distillation, to from 10 to 30 wt. % based on the aqueous polymer phase;

(b) carrying out a crosslinking after adding from 0.005 to 5 wt. %, based on the weight of the graft polymer components, of a crosslinking agent; and (c) separating the polymer as a powder.

DETAILED DESCRIPTION OF THE PREFERRED EMBODIMENTS

The inverse suspension polymerization is carried out with a phase ratio of organic phase to aqueous phase of from 4:1 to 1.5:1 parts by weight.

Hydrocarbons with from 6 to 12 carbon atoms are suitable solvents for the organic phase. Aliphatic or alicyclic hydrocarbons such as cyclohexane, n-hexane, $C_8$-isoparaffins, or technical petroleum fractions such as aromatics-free gasoline, ligroin, mineral spirits, or solvent naphtha with up to 20% aromatics and a boiling point in the range of 50 to 200° C. can be used.

The amount of polysaccharide for the graft polymerization is from 1 to 30 wt. %, preferably from 3 to 10 wt. %. Suitable polysaccharides are native starches from potatoes, corn, wheat, rice, or tapioca, or wax corn or high-amylose starch and its derivatives, especially starch ethers and esters. Cellulose or cellulose derivatives are also suitable.

70 to 99 wt. % of acrylic acid or methacrylic acid, 50 to 100% neutralized, are also used in aqueous solution as other starting materials. Up to 25 wt. % of other additional ethylenically unsaturated monomers may be used in aqueous solution for the polymerization, such as acrylamide, methacrylamide, Na salt of 2-acrylamido-2-methylpropanesulfonic acid, 2-methacryloylethanesulfonic acid, 2-hydroxyethyl acrylate, 2-hydroxyethyl methacrylate, N,N-dimethylaminoethyl acrylate or methacrylate, or their quaternary ammonium salts.

The suspension aids required for the inverse suspension polymerization are:

1. At least one nonionic surfactant at least partly soluble in the aliphatic hydrocarbon, with an HLB value below 10, preferably from 5 to 10. Such surfactants are preferably lipophilic sorbitan esters, for example sorbitan monolaurate or sorbitan monopalmitate. Polyethylene glycol(200) monooleate, polyethylene glycol(200) monolaurate, or polyethylene glycol(300) oleate are also suitable. These lipophilic surfactants are used in concentrations of from 1 to 10 wt. % based on the water-soluble monomer. The surfactant concentration is preferably from 2 to 5 wt. %.

2. At least one nonionic, water-soluble surfactant with an HLB value above 10, preferably from 12 to 20. Examples of such surfactants are polyethylene glycol ethers of an aliphatic monofunctional alcohol with 6 to 20 carbon atoms and a polyethylene glycol with 3 to 30, preferably 4 to 20 ethylene oxide units. Suitable examples are commercial $C_{12}$ fatty alcohol polyglycol ethers with 7 to 19 ethylene oxide units and an HLB value of 13 to 18. Also suitable are polyoxyethylene-sorbitan fatty acid esters with an HLB value of 10 to 20, such as polyoxyetnylene-sorbitan monolaurate or polyoxyethylene-sorbitan monooleate. These additives are used in concentrations of from 1 to 10 wt. % based on the water-soluble monomer. The concentration is preferably from 2 to 5 wt. %.

In contrast to the semicontinuous process, in single-step batch inverse suspension polymerization, the monomers containing free carboxyl groups are neutralized by aqueous alkali in the aqueous phase in the polymerization vessel in situ in the presence of the organic phase. Either the monomers can first be placed in the vessel and then the alkali added, or the alkali can first be placed in the vessel and then the monomers added.

Acrylic acid and methacrylic acid are from 50 to 100% neutralized, with a suitable agent, such as alkali metal hydroxide or ammonium hydroxide solutions with concentrations of from 15 to 30 wt. %. After preparing the aqueous phase and homogenizing it by stirring, the polysaccharide may be added in granular form.

The graft polymerization is initiated by adding a water-soluble initiator that provides free radicals, such as potassium persulfate, sodium persulfate, and/or ammonium persulfate, and heating the mixture to 40 to 100° C. The concentration of initiator is from 0.05 to 2 wt. % based on the weight of the water-soluble monomer. The reaction time is from 0.5 to 6 hours.

During the polymerization, from 0.005 to 1 wt. % of a completely or predominantly water-soluble crosslinking agent may be added. Suitable crosslinking agents are vinyl compounds such as N,N'-methylenebisacrylamide, 1,4-butanediol di(meth)acrylate, neopentyl glycol dimethacrylate, ethanediol di(meth)acrylate, dialkyl maleate, glycidyl (meth)acrylate, allyl methacrylate, polyethylene glycol(450) dimethacrylate, or ethylene glycol diglycidyl ether.

The water content during the inverse suspension polymerization is from 40 to 60 wt. % based on the aqueous monomer solution.

The graft polymerization may be carried out in any conventional reaction vessel suitable for batch reactions, which is equipped with a mixer and can be heated and cooled as desired.

In accordance with the present invention, a portion of the water is removed after the polymerization, to give a water content of from 10 to 30 wt. % based on the aqueous polymer phase, by azeotropic distillation. A water content of from 20 to 30 wt. % is preferably reached. The distillation is performed at from 50 to 120° C., bu either slight pressure or vacuum may also be applied. Conventional dewatering equipment with which the organic phase is recycled may be used.

After the partial water removal step, from 0.005 to 5 wt. %, based on the starting materials for the graft polymer, of a crosslinking agent is added. The amount of crosslinking agent added is preferably 0.05 to 0.5 wt. %, with epoxides being very especially preferred. Suitable examples are polyglycidyl ethers such as ethylene glycol diglycidyl ether, polyethylene glycol diglycidyl ether, glycerin triglycidyl ether, and diglycerin tetraglycidyl ethers. Polyaldehydes such as glyoxal or haloepoxy compounds such as epichlorohydrin may also be used. The crosslinking agents are suitably added in aqueous or organic solution. The crosslinking is accomplished by heating to from 50 to 100° C., preferably from 60 to 80° C. The crosslinking reaction may be terminated after 0.5 to 4 hours.

After the crosslinking, the products are obtained as small grains or beads. They may easily be separated from the continuous phase, for example, by filtering or centrifuging. They may then be dried to obtain a powdered product by any conventional processes, for example under vacuum or using a fluidized bed dryer. The filtrate may be reused in the next polymerization batch. Solvent and water may also be separated from the polymer powder by distillation.

In the context of the present invention, finely divided products are defined as products with particle sizes below 2 mm, of which more than 66 wt. % of the product should have particle sizes below 500 μm.

The formation of coarse agglomerates and cakes is very slight.

The process of the present invention has the following advantages:

1. The single-step inverse suspension polymerization procedure carried out in batches requires substantially less costly equipment than the conventional semicontinuous processes, since the separate preparation and addition of the aqueous monomer solution is omitted. Neutralization of the (meth)acrylate solution, graft polymerization, partial water removal, and crosslinking are carried out in one polymerization vessel.

2. The graft polymerization to finely divided product is further improved.

3. The end product is distinguished by a high porosity. It has a high absorption power and a very high suction power for water and body fluids. It is therefore especially suitable for incorporation in absorptive hygienic items containing cellulose such as disposable diapers, sanitary napkins, paper towels, and hospital bedding, and also as a drying agent, as swelling agents in sealing compositions, as thickeners, and as water reservoirs or moisture-holding agents in agriculture.

Other features of the present invention will become apparent in the course of the following descriptions of exemplary embodiments which are given for illustration and are not intended to be limiting thereof.

EXAMPLES

The following determinations were carried out for the examples.

Water content

The water content of the monomer solution is calculated from the amounts of starting materials, and the water content after the partial water removal is calculated from the amount of water removed by distillation.

Absorptive power 0.050 g of polymer in a 100 ml centrifuge tube is treated with 70 ml of distilled water, or 0.500 g of polymer is treated with 70 ml of synthetic urine (mixture of 3883 g of distilled water, 33.2 g NaCl, 4.0 g $MgSO_4 \cdot 7H_2O$, 2.4 g $CaCl_2$, and 77.6 g urea), and is soaked for one hour with gentle stirring. The gel phase is then centrifuged away from the sol phase for 0.5 hour at 4500 rpm and is weighed $$\text{Absorptive power} = \frac{\text{gel weight} - \text{sample weight}}{\text{sample weight}} \; (g/g)$$

Suction power 0.050 g of polymer (when using distilled water) or 0.100 g of polymer (when using synthetic urine) is spread on a sintered glass disk (Type G3, diameter 3 cm) that is connected to a liquid-filled burette and is leveled at the level of the sintered glass disk. The amount of liquid absorbed is measured on the burette at 0.5 to 5 minutes.

$$\text{Suction power} = \frac{\text{amount of liquid absorbed}}{\text{sample weight}} \; (g/g)$$

The examples pursuant to the invention are identified by numbers and the comparative examples by letters.

EXAMPLE 1

450 ml of a petroleum fraction with a boiling range of 80 to 110° C. (4.6% hexane, 76.7% heptane, and 18.7% octane) is placed in a 2-liter round-bottomed flask with blade mixer, nitrogen inlet, and water separator. With the stirrer running, 78 g of acrylic acid is then added, and 120 g of 25% sodium hydroxide solution is added with cooling over a period of half an hour, with the temperature in the flask not rising above 25° C. 4 g of sorbitan monolaurate (SPAN® 20 from Atlas, Wilmington, Del., U.S.A.), 1 g of polyethylene glycol with a molecular weight of 1550 (POLYDIOL 1550 from Huels AG), 1 g of natural corn starch, and 0.1 g of ammonium persulfate are then added. The polymerization is initiated by raising the temperature to 60° C. The jacket of the flask is cooled so that the inside temperature does not rise above 70° C. The polymerization is continued for 1 hour. The mixture is then heated to boiling. 75 g of water is removed by azeotropic distillation at the water separator. 0.050 g of ethylene glycol diglycidyl ether dissolved in 5 g of water is added at 65° C. and the stirring is continued for 2 hours at 70° C. The granular polymer formed is filtered off and dried for 5 hours at 50° C. under vacuum. The experimental results are shown in Table 1.

EXAMPLES 2 TO 7, COMPARATIVE EXAMPLES A AND B

The procedure of Example 1 is used, but the amounts of natural corn starch indicated in Table 1 are used.

As shown in Table 1, Examples 1 to 7 according to the present invention clearly show improved suction power for water and synthetic urine and a finer grain than the Comparative Examples A and B whose products contain no polysaccharide or too much polysaccharide. In addition, the porosity is increased in comparison with Comparative Example A. Specific surface areas relative to volume, $O_v$ ($m^3/cm^3$), as determined with an optical particle size analyzer were found to increase with increasing proportion of starch:

| | |
|---|---|
| Comparative Example A: | $O_v (m^3/cm^3) = 0.025$ |
| Example 2: | $O_v (m^3/cm^3) = 0.033$ |
| Example 4: | $O_v (m^3/cm^3) = 0.042$ |
| Example 5: | $O_v (m^3/cm^3) = 0.053$ |

COMPARATIVE EXAMPLES C AND D

The procedure of Examples 4 and 5 is used, but neither partial water removal nor crosslinking with ethylene glycol diglycidyl ether are carried out.

The products must be washed with acetone and carefully dried to avoid clumping. After drying, a fine powder is obtained with very good absorptive capacity but very poor suction power (cf. Table 1).

EXAMPLES 8 TO 10

The procedure of Example 1 is used, but 138 g of 25% sodium hydroxide solution is added, by which the acrylic acid is 80% neutralized. 3 g of sorbitan monolaurate, 1 g of polyoxyethylene sorbitan monolaurate (TWEEN® 20 from Atlas, Wilmington, Del., USA), 0.05 g of glycidyl acrylate, and natural corn starch (cf. Table 1) are then added. After adding 0.1 g of ammonium persulfate and 0.1 g of azobis(2-amidinopropane) hydrochloride, the polymerization is carried out at 60° C. 75 g of water is then separated by azeotropic distillation. Crosslinking is then carried out and the product is processed to a powder, as described in Example 1. Table 1 shows the experimental results.

EXAMPLES 11 AND 12

1,800 ml of a petroleum fraction with a boiling range of 80°–110° C. is placed in a 6-liter glass reactor with blade mixer, nitrogen inlet tube, and reflux condenser. 312 g of acrylic acid is dissolved and 480 g of 25% sodium hydroxide solution is then added. 16 g of sorbitan monolaurate, 4 g of polyethylene glycol with a molecular weight of 1550, 0.1 g of ethylenediamine tetraacetate, and wheat starch (cf. Table 1) are added. The mixture is then heated to 60° C., and a solution of 0.4 g of sodium persulfate in 10 g of water is then added over a period of 1 hour. After completion of the polymerization, 280 g of water is distilled off. After adding 0.6 g of ethylene glycol diglycidyl ether, the mixture is stirred for 2 hours longer at 70° C. The granular product is filtered off by suction and dried for 5 hours at 50° C. under vacuum.

COMPARATIVE EXAMPLE E

The procedure of Examples 11 and 12 is used. However, no wheat starch is added. The experimental results are summarized in Table 1.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A process for the preparation of a water-absorbing and water-swellable polysaccharide graft polymer, which comprises the steps of:
   (i) polymerizing, by single-step, batch, inverse suspension polymerization, a polymerization mixture comprising (a) from 1 to 30% by weight of a polysaccharide and (b) from 70 to 99% by weight of a first ethylenically unsaturated monomer selected from the group consisting of acrylic acid and methacrylic acid, which is 50 to 100% neutralized, to obtain an aqueous polymer phase;
   (ii) reducing the water content of said aqueous polymer phase by azeotropic distillation to from 10 to 30% by weight, based on said aqueous polymer phase, to obtain a reduced water content polymer; and
   (iii) crosslinking said reduced water content polymer with from 0.005 to 5% by weight, based on components (a) and (b), of a crosslinking agent to obtain said water-absorbing and water-swellable polysaccharide graft polymer.

2. The process of claim 1, wherein from 3 to 10% by weight of said polysaccharide is polymerized.

3. The process of claim 1, wherein said polysaccharide is one member selected from the group consisting of native potato starch, native corn starch, native wheat starch, native rice starch, native tapioca starch, wax corn starch, high-amylose starch, and cellulose.

4. The process of claim 1, wherein said polymerization mixture further comprises (c) from 0 to 25% by weight of a second ethylenically unsaturated monomer which contains a carboxyl group.

5. The process of claim 4, wherein said second ethylenically unsaturated monomer is one member selected from the group consisting of acrylamide, methacrylamide, Na salt of 2-acrylamido-2-methylpropanesulfonic acid, 2-methacryloylethanesulfonic acid, 2-hydroxyethyl acrylate, 2-hydroxyethyl methacrylate, N,N-dimethylaminoethyl acrylate, N,N-dimethylaminoethylmethacrylate and the quaternary ammonium salts thereof.

6. The process of claim 1, wherein said polymerizing step is carried out in the presence of a nonionic surfactant at least partly soluble in aliphatic hydrocarbon with a hydrophil-lipophil balance value below 10, and a nonionic water-soluble surfactant with a hydrophil-lipophil balance value above 10.

7. The process of claim 6, wherein said nonionic surfactant at least partly soluble in aliphatic hydrocar-

TABLE 1

| Example No. | Starting Materials | | | Absorption Capacity (g/g) | | Suction power (g/g) | | | | Screen analysis | | |
| | Acrylic acid (g) | NaOH solution (g) | Natural Corn Starch (g) | Water | Synth. urine | Water | | Synth. urine | | >800 μ | 500–800 μ | 100–500 μ |
| | | | | | | Time 0.5 | (min.) 5 | Time 0.5 | (min.) 5 | | | |
| A | 78 | 120 | — | 590 | 38 | 32 | 60 | 8 | 22 | 49 | 25 | 26 |
| 1 | 78 | 120 | 1 | 610 | 36 | 42 | 65 | 12 | 22 | 5 | 3 | 92 |
| 2 | 78 | 120 | 2 | 615 | 35 | 52 | 90 | 12 | 21 | 5 | 3 | 92 |
| 3 | 78 | 120 | 4 | 620 | 35 | 55 | 92 | 13 | 25 | 7 | 2 | 91 |
| 4 | 78 | 120 | 6 | 620 | 40 | 60 | 100 | 12 | 28 | 4 | 5 | 91 |
| 5 | 78 | 120 | 11 | 560 | 38 | 75 | 110 | 18 | 30 | 5 | 4 | 91 |
| 6 | 78 | 120 | 17 | 510 | 37 | 80 | 120 | 17 | 30 | 8 | 5 | 87 |
| 7 | 78 | 120 | 25 | 450 | 36 | 66 | 110 | 17 | 30 | 6 | 7 | 87 |
| B | 78 | 120 | 40 | 250 | 22 | 40 | 80 | 7 | 17 | 85 | 12 | 3 |
| C | 78 | 120 | 6 | 630 | 46 | — | 32 | — | 7 | 7 | 5 | 88 |
| D | 78 | 120 | 11 | 560 | 41 | 14 | 48 | 5 | 14 | 7 | 5 | 88 |
| 8 | 78 | 138 | 6 | 525 | 50 | 54 | 100 | 10 | 25 | 8 | 4 | 88 |
| 9 | 78 | 138 | 12 | 545 | 50 | 65 | 115 | 15 | 27 | 5 | 4 | 91 |
| 10 | 78 | 138 | 25 | 545 | 50 | 68 | 120 | 15 | 30 | 7 | 3 | 90 |
| 11 | 312 | 480 | 24* | 620 | 40 | 76 | 130 | 15 | 26 | 3 | 7 | 90 |
| 12 | 312 | 480 | 44* | 540 | 50 | 90 | 170 | 16 | 28 | 6 | 9 | 85 |
| E | 312 | 480 | — | 504 | 35 | 28 | 86 | 10 | 22 | 15 | 22 | 63 |

*Wheat starch bon has a hydrophil-lipophil balance value of from 5 to 10.

8. The process of claim 6, wherein said nonionic surfactant at least partly soluble in aliphatic hydrocarbon is one member selected from the group consisting of sorbitan monolaurate, sorbitan monopalmitate, polyethylene glycol(200) monooleate, polyethylene glycol(200) monolaurate, and polyethylene glycol(300) oleate.

9. The process of claim 6, wherein said nonionic water-soluble surfactant has a hydrophil-lipophil balance value of from 12 to 20.

10. The process of claim 6, wherein said nonionic water-soluble surfactant is one member selected from the group consisting of polyethylene glycol ethers of aliphatic monofunctional alcohols with from 6 to 20 carbon atoms, polyethylene glycols with from 3 to 30 ethylene oxide units, and polyoxyethylene-sorbitan fatty acid esters.

11. The process of claim 1, wherein said polymerizing step is initiated by a water-soluble initiator which is one member selected from the group consisting of potassium persulfate, sodium persulfate, and ammonium persulfate.

12. The process of claim 1, wherein the water content is reduced to from 20 to 30 % by weight based on said aqueous polymer phase.

13. The process of claim 1, wherein said crosslinking step utilizes from 0.05 to 0.5% by weight, based on components (a) and (b), of said crosslinking agent and is carried out at 50 to 100° C.

14. The process of claim 13, wherein said crosslinking agent is an epoxide and said crosslinking step is carried out at from 60 to 80° C.

15. The process of claim 1, wherein said polymerization step is carried out in the presence of 0.005 to 1% by weight, based on the weight of (a) and (b), of a crosslinking agent.

* * * * *